United States Patent [19]

Baker et al.

[11] Patent Number: 4,530,102
[45] Date of Patent: Jul. 16, 1985

[54] LANCING IN ELECTRIC ARC STEELMAKING

[75] Inventors: Steven S. Baker, Rotherham; Peter J. Webb, Sheffield; John B. Clarke, Rotherham, all of England

[73] Assignee: British Steel Corporation, London, England

[21] Appl. No.: 525,638

[22] Filed: Aug. 23, 1983

[30] Foreign Application Priority Data

Aug. 25, 1982 [GB] United Kingdom ............... 8224406

[51] Int. Cl.³ ........................................... H05B 7/152
[52] U.S. Cl. ..................................... 373/105; 266/80; 266/86
[58] Field of Search ............... 373/60, 104, 106, 105; 266/80, 86, 226; 75/12, 60; 73/290 V

[56] References Cited

U.S. PATENT DOCUMENTS

| | | | |
|---|---|---|---|
| 3,610,601 | 10/1971 | Bishop | 266/86 |
| 3,741,557 | 6/1973 | Harbaugh et al. | 266/86 |
| 4,098,128 | 7/1978 | Baumert | 73/290 V |
| 4,345,746 | 8/1982 | Schleimer et al. | 75/60 |
| 4,368,877 | 1/1983 | Baumert | 75/60 |
| 4,398,948 | 8/1983 | Emoto et al. | 75/60 |

Primary Examiner—A. D. Pellinen
Assistant Examiner—Gregory D. Thompson
Attorney, Agent, or Firm—Silverman, Cass & Singer, Ltd.

[57] ABSTRACT

A method of controlling the depth of immersion of an oxygen lance in a molten bath within an electric arc furnace where noise emitted from the furnace during lancing in an acoustic spectrum ranging between 1 kHz and 15 kHz defined by a plurality of selected frequency bands is monitored. The position of the lance with respect to the bath surface is controlled by reference to the amplitudes of the output signals emitted from each of the selected frequency bands. There is a distinct change in the relationship of particular bands to provide a "lance out" signal which is directed to a control for a lance drive mechanism. Apparatus for practicing the method includes a microphone, a filter unit, a microprocessor and a lance drive responsive to signals from the microprocessor.

5 Claims, 7 Drawing Figures

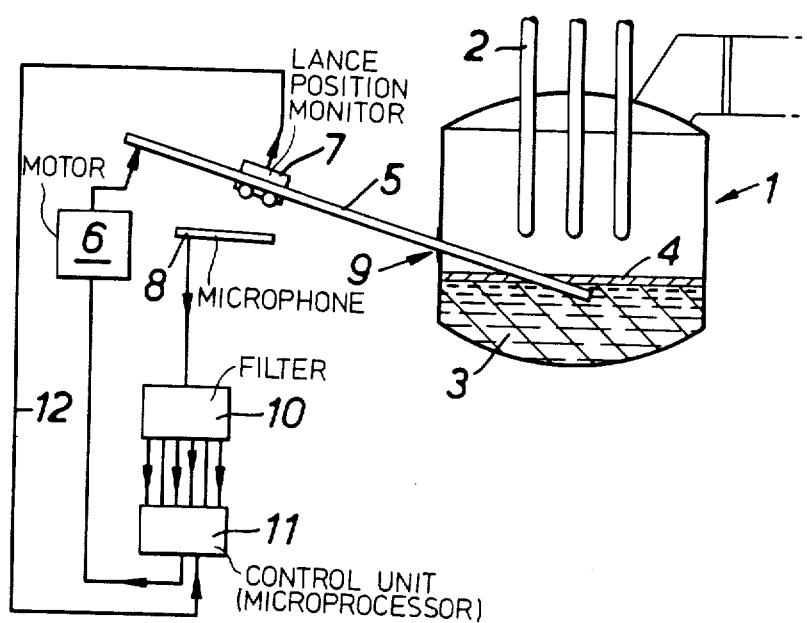

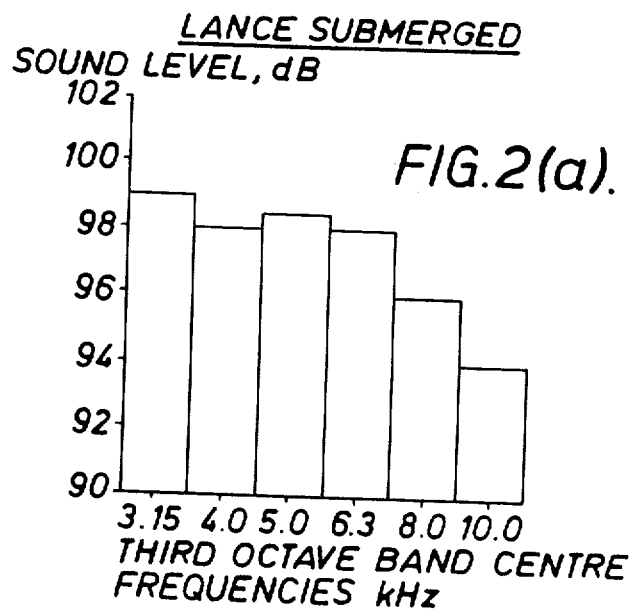
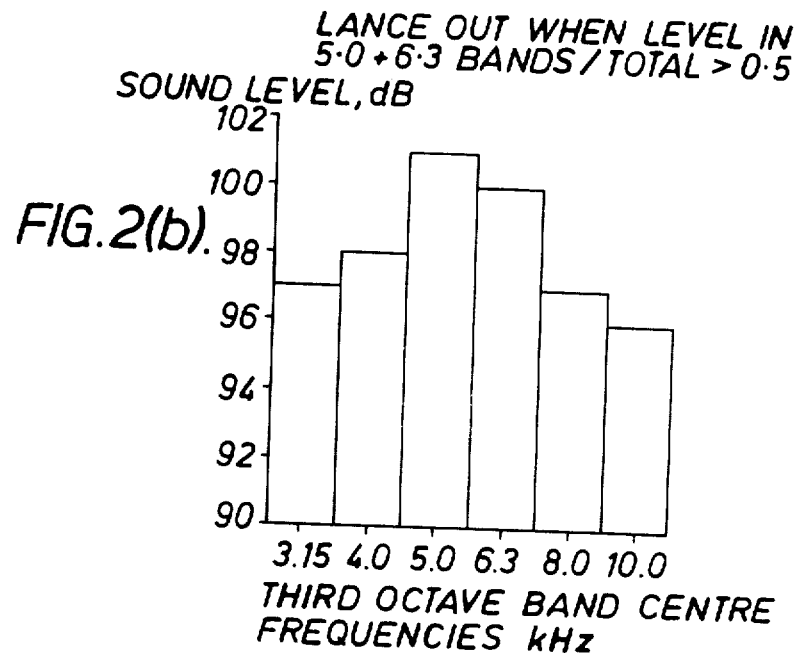

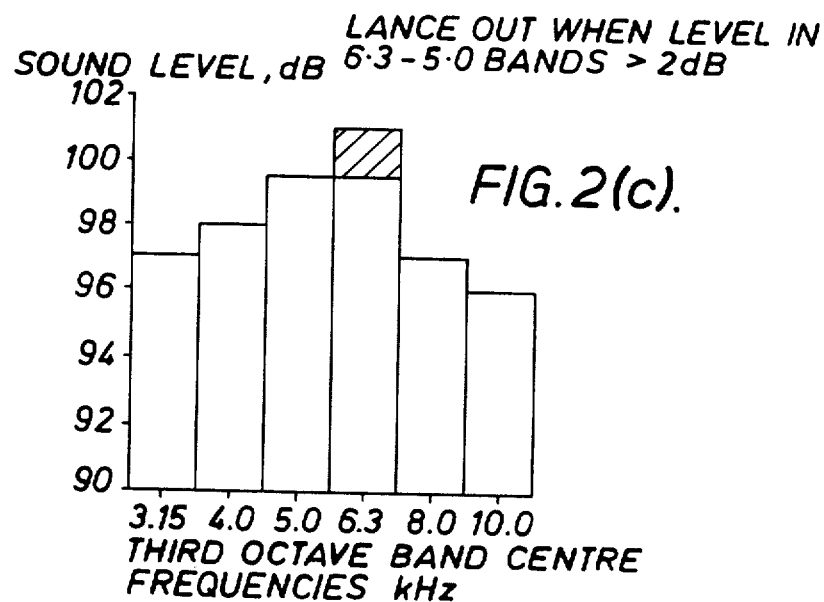
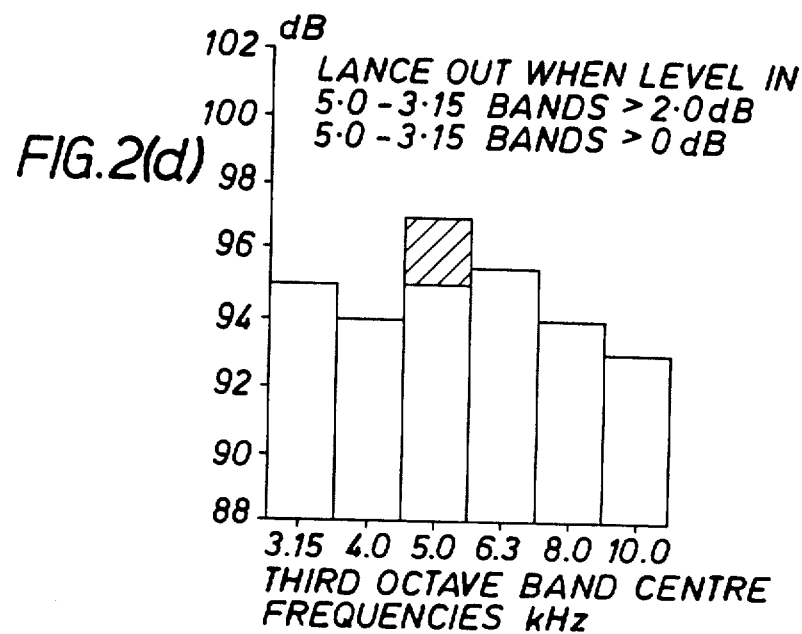

LANCING IN ELECTRIC ARC STEELMAKING

BACKGROUND OF THE INVENTION

This invention relates to a method of, and apparatus for, controlling the depth of immersion of an oxygen lance in an electric arc steelmaking furnace.

SUMMARY OF THE INVENTION

From one aspect the present invention provides a method of controlling the depth of immersion of an oxygen lance in the molten bath in an electric arc furnace, in which an analysis is made of the acoustic spectrum between 1 kHz and 15 kHz defined by adjacent pre-selected frequency bands and the amplitudes of each said band are measured from which control signals are processed to determine when the lance tip is submerged, that position being maintained as required.

Preferably, the acoustic spectrum analysed is the ⅓rd octave band for a range of frequencies extending between 3.15 kHz and 10 kHz.

The lance may be 'consumable'.

The invention also provides apparatus for performing the above method, comprising a microphone directionally responsive to noise from the oxygen lance port, a filter unit for isolating the acoustic spectrum specified, a processing unit and a lance drive mechanism actuated manually or automatically in response to control signals derived from said processing unit.

In accordance with this invention use is made of the change in acoustic spectrum which occurs when the oxygen lance is not immersed. The technique has the advantage of rapid response and ensures that periods of lancing across the bath surface, during which time maximum damage is imparted to the electrodes and the refractory linings, are minimised. More efficient utilisation of oxygen is ensured and this results in a reduction in the amount of oxygen consumed during the pre-blow and refine periods.

Further, the efficient utilization of oxygen should enable the target bath carbon at melt out to be achieved with greater consistency and thus result in considerable time saving on some casts. In addition, with the achievement of more consistent oxygen lancing practice the energy content of the waste gases in the form of unburnt carbon monoxide and hydrogen is more predictable. Accordingly, there exists the possibility of utilising some of this energy in the furnace by encouraging the combustion of these gases in the furnace by the introduction of controlled amounts of air and/or oxygen. Substantial energy savings are available if the potential energy in the waste gases can be released in this way within the furnace, particularly during the pre-blow period.

BRIEF DESCRIPTION OF THE DRAWINGS

In order that the invention may be fully understood one embodiment thereof will now be described, by way of example, with reference to the accompanying drawings in which;

FIG. 1 is a schematic illusation of apparatus in accordance with this invention; and FIGS. 2(a) to 2(f) are graphical traces of the acoustic respnse depicting the control criteria.

DETAILED DESCRIPTION OF THE DRAWINGS

Figure 2E:
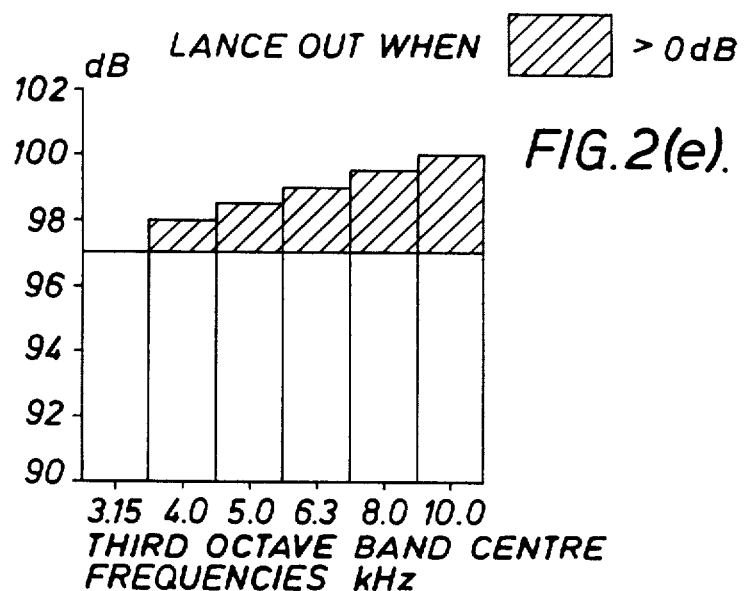
Figure 2F:
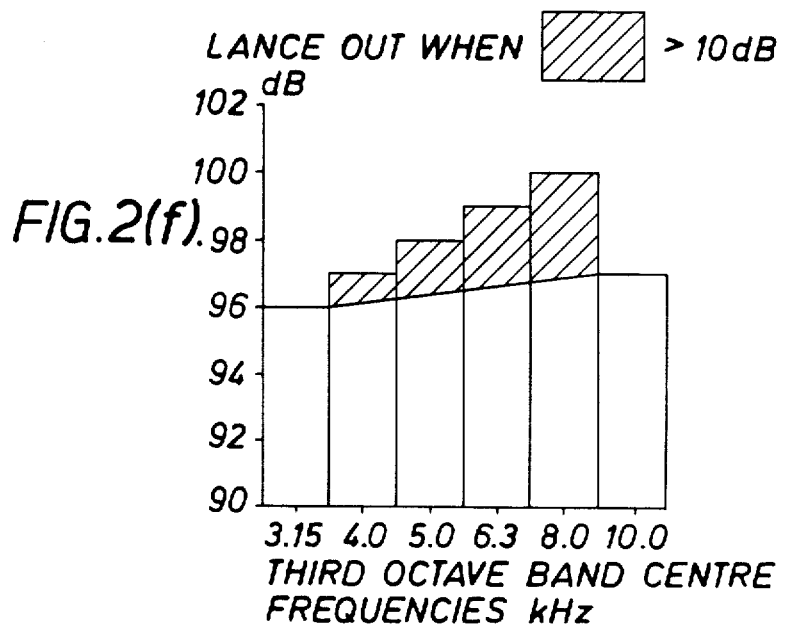

Referring now to FIG. 1, an electric arc furnace 1 is depicted with three electrodes 2 dependent over a molten bath of steel 3 surmounted by a slag layer 4. An oxygen lance 5 extends into the molten bath through a port in the furnace wall—this is driven by a motor 6 (either manually or automatically) and the lance position is monitored by a unit 7.

A diretional microphone 8 is directed towards the port 9 and the output from this applied to a series of filters 10, the outputs from which are processed in a unit 11 to control the lance position via motor 6 in a manner to be described. Positional feedback control is provided via the link 12.

In operation, the primary objective is to arrange for the lance tip to be just submerged; the lance is initially advanced into the melt and the output from the microphone 8 is applied to the filter unit 10. Six filters are provided responsive to third octave bands of frequencies centred on 3.15, 4.0, 5.0, 6.3, 8.0 and 10.0 kHz. and the amplitude of the outputs from these filters varies in dependence on the lance position.

This is shown in particular in FIGS. 2(a) to 2(f). Typical outputs from the six filters when the lance is fully submerged are shown in FIG. 2(a) the amplitudes lying between 94 dB and 99 dB. In this condition the microprocessor unit 11 produces no output control signal.

One condition in which an output will be produced indicative of the lance being out of the bath is if the summation of the signal levels in the 5.0 and 6.3 bands divided by the sum of the signal levels of all the bands sampled exceeds 0.5. This is the situation depicted in FIG. 2(b).

Processing unit 11 will also provide an output when the difference in the levels between the 6.3 and 5.0 bands exceeds 2 dB (FIG. 2(c)) and when the difference between the 5.0 and 3.15 bands exceeds 0 dB (FIG. 2(d)). Finally in FIG. 2(e) a comparison is made of the acoustic spectrum using the 3.15 band as the base level and in FIG. 2(f) using both the 3.15 and 10.0 bands. In FIG. 2(e) a 'lance out' control signal is generated when the sum of the levels of the bands above the 3.15 band level exceeds the sum of the levels of those bands below the 3.15 level—in the example shown there is no level below that of the 3.15 figure—and in FIG. 2(f) an output signal is generated when the sum of the levels of the four centre bands, measured from a base line determined by the 3.15 kHz and 10.0 kHz levels, exceeds 10 dB.

Further control signals may be generated to govern the rate at which the lance is driven towards the melt. One such arrangement is shown in FIG. 2(d) where should the difference between the 5.0 and 3.15 bands exceed 2 dB then a further signal is generated to project the lance along its path at a faster rate.

It is to be understood of course that the particular spectral analysis described is only exemplary. A variety of other conditions may depict the lance out/lance submerged situation and indeed it is not essential for the ⅓rd octave bands to be selected for analysis, these bands have been found to be the most definitive in control but ½ octave or ¼ octave bands might alternatively be utilised.

We claim:

1. A method of controlling the depth of immersion of an oxygen lance in a bath of molten material contained in an electric arc furnace, comprising the steps of monitoring the noise emitted from the furnace during lancing in an acoustic spectrum ranging between 1 kHz and 15 kHz and defined by a plurality of selected frequency bands, and controlling the position of the lance with respect to the bath surface by reference to the amplitudes of the output signals emitted from each of the selected frequency bands.

2. A method as claimed in claim 1 in which the emitted noise is applied to a plurality of frequency filters responsive to third octave bands of frequencies ranging between 3.15 kHz and 10 kHz.

3. A method as claimed in claim 1 in which the lance is consumable.

4. A method as claimed in claim 1 wherein the output signals emitted from the selected frequency bands are fed to a microprocessor programmed to transmit an output signal representative of the amplitudes of the outputs of the frequency band, to a drive mechanism operable to vary the position of the lance relative to the bath surface.

5. Apparatus controlling the depth of immersion of an oxygen lance in a bath of molten material contained in an electric arc furnace, comprising a microphone directionally responsive to noise emitted from the furnace in an acoustic spectrum ranging between 1 kHz and 15 kHz, a series of frequency filters responsive to selected frequeny bands connected to receive noise output signals from the microphone, a microprocessor connected to receive signals from each of the frequency filters and to transmit output signals representative of the amplitudes of the signals emitted by the filters, and a drive mechanisim connected to receive the aforesaid output signals and operable to vary the position of the lance relative to the bath surface in dependence upon the microprocessor output signals.

* * * * *